United States Patent Office 3,028,656
Patented Apr. 10, 1962

3,028,656
CERAMIC MATERIAL AND METHOD OF PRODUCING THE SAME
John M. Herbert, Horton, England, assignor to The Plessey Company Limited, Ilford, England, a British company
No Drawing. Filed Sept. 13, 1955, Ser. No. 542,478
5 Claims. (Cl. 29—25.42)

This invention relates to ceramic materials and is concerned with the manufacture of a ceramic material of high permittivity suitable for use as a condenser dielectric.

It has for an object to provide an improved ceramic material of high permittivity which will retain good insulating qualities when fired in a reducing atmosphere.

Another object is to provide an improved ceramic material of high permittivity which is particularly suitable for the manufacture of condensers having base metal electrodes intimately joined to it by the firing and which will permit these condensers to be manufactured by first preparing superimposed films respectively containing the components of the ceramic material and the base metal for the electrodes, at least one of said layers containing an organic binder which is eliminated by heating in an oxidising atmosphere.

According to the invention the material comprises barium titanate together with a substantial quantity of manganous oxide and is produced by firing suitable ingredients in hydrogen. Preferably the ingredients are in the proportions required to give $2BaTiO_3MnO$, although it is doubtful if such a mixed oxide exists. The material contains free manganous oxide and a compound closely resembling barium titanate and which is believed to be a solution of manganous oxide in barium titanate.

Although the dielectric is slightly inferior in electrical properties when compared with ceramic compositions fired in air, it is quite suitable for smoothing condensers and the like and the invention makes possible the economical manufacture of condensers of large capacitance (say 8 mfd.) with a high permittivity ceramic dielectric.

An advantage of the invention is that it is possible for base metal electrodes to be sintered simultaneously with the firing of the ceramic composition; any metal can be used which does not react with barium titanate or melt below 1300° C.

In order that the invention may be more fully and clearly understood various ways of putting the invention into effect will now be described.

Three possible compositions for the dielectric material, which will for convenience be referred to as A, B and C, are given below, the proportions being by weight:

|  | A | B | C |
|---|---|---|---|
| Barium carbonate | 118.4 | 130.0 | 130.0 |
| Titanium dioxide | 47.9 | 52.6 | 51.3 |
| Manganese carbonate | 34.5 | 19.0 | 37.9 |
| Zirconium dioxide |  |  | 2.03 |

The ingredients in the form of fine powders produced by precipitation, are thoroughly mixed and then fired in air at 1100° C. for two hours. The resulting mass is then ground to provide the raw material for capacitor dielectrics, the production of which will be described hereinafter.

It is convenient for the capacitor electrodes to be also produced from raw material in powder form and suitable electrode compositions D, E and F are given below, the proportions being by weight:

|  | D | E | F |
|---|---|---|---|
| Iron powder |  | 60 | 36 |
| Iron oxide | 40 | 40 | 24 |
| Dielectric composition A | 60 |  | 40 |

In the case of composition D, the powdered ingredients are well mixed, fired in air at 1000° C. for two hours and then ground; compositions E and F are simply mixtures of powders.

In the construction of capacitors, it is often advantageous to have the electrodes and dielectric in the form of films, and for this purpose the above compositions can be mixed with a binding lacquer. A suitable lacquer comprises cellulose acetobutyrate, diamyl tartarate, and ethylene dichloride in the proportions by weight of 9, 5 and 50 respectively. 100 parts of lacquer are thoroughly mixed with 180 parts of a powdered dielectric or electrode composition. The semi-fluid mass thus produced is spread in a uniform thin layer on a smooth surface. After drying, the resulting film is peeled from the surface and cut into pieces of the required size and shape.

One way in which the above compositions can be used to construct a capacitor, is to assemble alternate pieces of dielectric and electrode film made as described above, to form a stack of interleaved parts. The pieces of film are caused to adhere together by applying pressure (0.5 ton per sq. in.) at a temperature of 120° C. The electrode films can be joined together by painting the gaps between their projecting ends with a suspension of one of the electrode compositions.

If an electrode composition such as D which is free of metal is used in the above construction, the assembled stack can be fired at 500–1000° C. in air to remove all organic matter. Thereafter, it has to be fired in hydrogen at 1150° C. for two hours in order to mature the ceramic dielectric and to reduce and sinter the electrodes.

If composition E or F is used the entire firing process can be conveniently carried out in hydrogen. The carbonaceous residue of the plastic binder can be eliminated by introducing a small amount of carbon dioxide or water into the furnace atmosphere at a temperature somewhat below that at which sintering takes place. For instance, when the furnace temperature reaches 1000° C. the hydrogen supply is passed through a vessel containing water at 70° C. before it enters the furnace. The gas picks up sufficient water vapor in this way to oxidise any carbon but not enough to oxidise metallic iron. After an hour at 1000° C. the furnace is heated to the sintering temperature, 1150° C., the water is removed from the gas circuit and the sintering completed in dry hydrogen.

Another manner of constructing a capacitor is to take pieces of dielectric film, oxidise them free of organic matter and then fire in hydrogen. These pieces may then be coated with a suspension of iron and glass powders containing not more than 3 parts of powdered glass to one of iron; the glass is matched in coefficient of thermal expansion to the iron and the titanate composition. The coated pieces are interleaved and any end connections made with the iron-glass suspension. The assemblies are then fired in hydrogen to a sufficiently high temperature to sinter the glass.

The advantage of the method in this case lies in the cheapness of the iron and glass electrode material which may be applied thickly to the dielectric pieces so that, on sintering, it will fill the spaces which would otherwise be present due to the lack of perfect flatness of the dielectric layers.

The dielectric and electrode materials can also be extruded as ribbon and wound together in a similar manner to paper condensers, and then subsequently sintered.

The dielectric may be pressed as a compact from powder with or without a suitable binder and combined either with similar compacts of electrode material or with the electrode material combined in a plastic bound film.

The electrode may also be in the form of a metallic wire which is coated with the powdered dielectric material. The dielectric is sintered in hydrogen to form an adherent enamel. An outer electrode may either be applied subsequently or as a further coating prior to sintering.

The sintered capacitor assemblies require the attachment of leads and to be coated with an insulating medium to protect them from the atmosphere. In the case of electrode composition E wires may be hard or soft soldered to the sintered parts. In the case of D and F direct soldering is difficult though the exposed parts of the electrodes may be electroplated and then soldered. Leads can be attached with a paste of glass and iron powders which is heated so as to melt the glass; this operation can be combined with the application of a coating of glass to the whole assembly.

Dielectrics when prepared from compositions A, B and C by the above methods have the properties tabulated below:

| Temperature, °C. | A | | B | | C | |
|---|---|---|---|---|---|---|
| | Dielectric Constant | Power Factor, Percent | Dielectric Constant | Power Factor, Percent | Dielectric Constant | Power Factor, Percent |
| 20 | 3,300 | 2.7 | 4,200 | 3.0 | 3,200 | 0.75 |
| 30 | 3,360 | 2.2 | 4,300 | 3.0 | 3,090 | 0.75 |
| 40 | 3,620 | 2.2 | 4,800 | 2.7 | 2,840 | 0.75 |
| 50 | 4,050 | 2.1 | 4,970 | 2.7 | 2,520 | 0.75 |
| 60 | 4,500 | 1.8 | 4,680 | 2.8 | 2,210 | 0.80 |
| 70 | 4,380 | 1.8 | 4,000 | 3.1 | 1,920 | 0.90 |
| 80 | 3,600 | 1.8 | 3,340 | 3.3 | 1,650 | 1.00 |
| 90 | 3,000 | 1.8 | 2,800 | 3.4 | 1,410 | 1.00 |
| 100 | 2,440 | 1.9 | 2,400 | 3.6 | 1,260 | 1.02 |

I claim:
1. A method of manufacturing a capacitor having sintered electrodes and sintered dielectrics by mixing a powdered mixture which will yield on sintering in air a dielectric material which consists essentially of $BaTiO_3$ and MnO in quantities approximately corresponding to the formula $2BaTiO_3 \cdot MnO$, applying to the sintered dielectric material an electrode mass obtained by mixing together $Fe_2O_3$ and metallic iron powder and firing the dielectric material together with the electrode substance in a hydrogen atmosphere.

2. A method of producing a capacitor having electrodes sintered to a sintered dielectric material by mixing $BaCO_3$, $TiO_2$ and a compound which decomposes to MnO on firing in air in powder form and sintering in air to form a dielectric material which consists essentially of $BaTiO_3$ and MnO in quantities corresponding to the formula $2BaTiO_3 \cdot MnO$, applying to the sintered dielectric material an electrode mass obtained from $Fe_2O_3$ mixed with a quantity of the sintered dielectric in powder form, firing the dielectric material and the electrode mass in a reducing atmosphere.

3. A method of producing a capacitor comprising forming the dielectric parts of the capacitor of a powdered mixture which will yield on sintering the mixture in air, a sintered material consisting of $BaTiO_3$ and MnO in quantities approximately corresponding to the formula $2BaTiO_3 \cdot MnO$, sintering said mixture in air, sintering in air a powdered mixture of $Fe_2O_3$ and metallic iron powder to produce a sintered electrically conductive electrode material, separately grinding the sintered dielectric and electrode material, separately mixing each powdered material with an organic binder, pouring each mixture as a thin layer upon a separate support, drying the layers of dielectric and electrode material, peeling off the layers as films after the drying, superimposing and pressing alternate films of dielectric and electrode material together, removing the organic binder by sintering the superimposed layers in an oxidising atmosphere, and sintering the dielectric and electrode material in a reducing atmosphere.

4. A method of producing a capacitor comprising forming the dielectric parts of the capacitor by mixing $BaCO_3$, $TiO_2$ and $MnCO_3$ in powder form, sintering the mixture in air to form a sintered material consisting of $BaTiO_3$ and MnO in quantities approximately corresponding to the formula $2BaTiO_3 \cdot MnO$, sintering in air a powdered mixture of $Fe_2O_3$ and metallic iron powder to produce a sintered electrically conductive electrode material, separately grinding the sintered dielectric and electrode material, separately mixing each powdered material with an organic binder, pouring each mixture as a thin layer upon a separate support, drying the layers of dielectric and electrode material, peeling off the layers as films after the drying, superimposing and pressing alternate films of dielectric and electrode material together, removing the organic binder by sintering the superimposed layers in a hydrogen atmosphere containing $CO_2$, and finally sintering in a hydrogen atmosphere.

5. A method of producing a capacitor comprising forming the dielectric parts of the capacitor by mixing $BaCO_3$, $TiO_2$ and a compound which will yield on firing manganous oxide in powder form, sintering the mixture in air to form a sintered material consisting of $BaTiO_3$ and MnO in quantities approximately corresponding to the formula $2BaTiO_3 \cdot MnO$, sintering in air a powdered mixture of $Fe_2O_3$ and metallic iron powder to produce a sintered electrically conductive electrode material, separately grinding the sintered dielectric and electrode material, separately mixing each powdered material with an organic binder, pouring each mixture as a thin layer upon a separate support, drying the layers of dielectric and electrode material, peeling off the layers as films after the drying, superimposing and pressing alternate films of dielectric and electrode material together, removing the organic binder by sintering the superimposed layers in a hydrogen atmosphere containing steam at an elevated temperature, and finally sintering in a hydrogen atmosphere.

References Cited in the file of this patent

UNITED STATES PATENTS

| | | |
|---|---|---|
| 2,395,442 | Ballard | Feb. 26, 1946 |
| 2,486,560 | Gray | Nov. 1, 1949 |
| 2,520,376 | Roup et al. | Aug. 29, 1950 |
| 2,529,719 | Wentworth | Nov. 14, 1950 |
| 2,538,554 | Cherry | Jan. 16, 1951 |
| 2,616,859 | Verwey | Nov. 4, 1952 |
| 2,640,165 | Howatt | May 26, 1953 |
| 2,750,657 | Herbert et al. | June 19, 1956 |

FOREIGN PATENTS

| | | |
|---|---|---|
| 574,577 | Great Britain | Jan. 11, 1946 |